(12) United States Patent
Konrad

(10) Patent No.: US 6,471,025 B2
(45) Date of Patent: Oct. 29, 2002

(54) ACTUATING DEVICE FOR THE ACTUATION, IN PARTICULAR PNEUMATIC ACTUATION, OF A FRICTION CLUTCH

(75) Inventor: Andreas Konrad, Untertheres (DE)

(73) Assignee: Mannesmann Sachs AG, Schweinfurt (DE)

(*) Notice: Subject to any disclaimer, the term of this patent is extended or adjusted under 35 U.S.C. 154(b) by 23 days.

(21) Appl. No.: 09/732,527

(22) Filed: Dec. 7, 2000

(65) Prior Publication Data

US 2001/0002642 A1 Jun. 7, 2001

(30) Foreign Application Priority Data

Dec. 7, 1999 (DE) .......................... 199 58 874.0

(51) Int. Cl.[7] .............................................. F16D 25/08
(52) U.S. Cl. ...................... 192/85 CA; 192/91 A; 91/388; 91/403
(58) Field of Search ................... 192/85 CA, 91 A, 192/109 F; 60/325, 535, 537, 542; 91/388, 403, 460

(56) References Cited

U.S. PATENT DOCUMENTS

| 4,796,739 A | * | 1/1989 | Jonner et al. ............. 192/13 R |
| 5,950,788 A | * | 9/1999 | Willert et al. ............. 192/85 C |
| 6,029,789 A | * | 2/2000 | Linder et al. ........... 192/85 CA |
| 6,116,399 A | * | 9/2000 | Drexl et al. ............. 192/109 F |
| 6,196,369 B1 | * | 3/2001 | Willert et al. ............. 192/85 C |

FOREIGN PATENT DOCUMENTS

| DE | 197 16 600 A1 | 12/1997 |
| DE | 197 16 641 A1 | 7/1998 |
| DE | 198 00 232 A1 | 7/1998 |
| DE | 197 14 226 A1 | 10/1998 |

* cited by examiner

Primary Examiner—Saul Rodriguez
(74) Attorney, Agent, or Firm—Cohen, Pontani, Lieberman & Pavane

(57) ABSTRACT

An actuating device for a friction clutch arranged in the drive train of a motor vehicle. The actuating device has a positioning servo arrangement with a pressure-medium power cylinder arrangement which acts on a disengagement bearing arrangement. There is provision, for assigning to a pressure-medium subsystem, made up of the pressure-medium power cylinder arrangement and a control valve of the positioning servo arrangement, a pressure compensating orifice which, at least when the positioning servo arrangement is in a holding state, permits a defined pressure-medium pressure compensating flow, in order to influence at least one positioning behavior of the positioning servo arrangement.

47 Claims, 8 Drawing Sheets

ACTUATING DEVICE FOR THE ACTUATION, IN PARTICULAR PNEUMATIC ACTUATION, OF A FRICTION CLUTCH

BACKGROUND OF THE INVENTION

1. Field of the Invention

The invention relates to an actuating device for a friction clutch arranged in the drive train of a motor vehicle, in particular a commercial motor vehicle, between an internal combustion engine and a gear unit. The actuating device includes a disengagement bearing arrangement for actuating the friction clutch, and a positioning servo arrangement with a pressure-medium power cylinder arrangement which acts on the disengagement bearing arrangement and which is capable of being actuated, via a control valve connected to a pressure-medium source, as a function of a command quantity representing a desired position and of an actual quantity representing a position of the disengagement bearing arrangement. The control valve comprises a valve arrangement which is capable of being adjusted between a first control state connecting the pressure-medium power cylinder arrangement to the pressure-medium source and a second control state connecting the pressure-medium power cylinder arrangement to a first pressure compensating orifice. The valve arrangement is capable of being changed over between the two control states as a function of the actual quantity and of the command quantity, preferably as a function of a differential quantity assigned to the actual quantity and to the command quantity.

2. Description of the Prior Art

An actuating device of this type is known, for example, from German reference DE 197 16 600 A1, to which reference is made as "reference document 1" and the disclosure content of which is incorporated herein by reference. Further actuating devices of this type are known from German reference DE 197 16 641 A1 (reference is made to this as "reference document 2"), German reference DE 197 14 226 A1 which corresponds to U.S. Pat. No. 5,950,788 (reference is made to this as "reference document 3") and German reference DE 198 00 232 A1 (reference is made to this as "reference document 4"). The disclosure of reference documents 2, 3 and 4 is likewise incorporated by reference in the disclosure of the present invention description.

Irrespective of the design of the control valve (reference documents 1 to 4 disclose various possibilities for designing the positioning servo arrangement and the control valve), it was shown that the positioning behavior of actuating devices of this type is unsatisfactory in many respects. Thus, there needs to be an improvement in the positioning accuracy and in the response behavior along the lines of a more direct response. In particular, there was shown to be a hysteresis behavior of the positioning servo arrangement in the assignment of the desired position and actual position, with so-called "play during extension" and "play during retraction" (generally a regulating travel play). The time response behavior of the known positioning servo arrangements also could not satisfy all requirements. The limitations in the performance of the known actuating device would seem to be attributable at least partially to static friction and sliding friction in the disengagement bearing arrangement and/or the pressure-medium power cylinder arrangement and/or between components, moved relative to one another, of the control valve or, in general, of the positioning servo arrangement and are also reflected in the magnitude of a minimum regulating increment which the positioning servo arrangement has and which does not satisfy all requirements.

SUMMARY OF THE INVENTION

By contrast, an object of the present invention is to provide an actuating device of the type initially mentioned, which allows improvements to the problems mentioned. In order to achieve this object, it is proposed that there be provided, in a pressure-medium subsystem comprising the pressure-medium power cylinder arrangement and the control valve, a second pressure compensating orifice which, at least when the positioning servo arrangement is in a holding state, permits a defined second pressure-medium pressure compensating flow smaller than a first pressure-medium pressure compensating flow permitted by the first pressure compensating orifice in the second control state, in order to influence at least one positioning behavior of the positioning servo arrangement.

To be precise, it was shown, surprisingly, that a measure which per se is extremely simple, namely the provision of a defined leak in said pressure-medium subsystem, for example in the pressure-medium power cylinder arrangement and/or in a pressure-medium connection connecting the control valve to the pressure-medium power cylinder arrangement and/or in a portion of the control valve located on the same side as the pressure-medium power cylinder arrangement, is sufficient to influence the positioning behavior of the positioning servo arrangement for adaption to requirements to be fulfilled. It is possible, for example, for a response behavior of the positioning servo arrangement to be improved, for example to the effect of reducing an idle time assigned to the positioning servo arrangement. Furthermore, it is possible, by means of the second pressure compensating orifice, to reduce a minimum regulating increment of the positioning servo arrangement and/or to reduce a regulating error of the positioning servo arrangement. It is particularly important, for many driving situations, that the second pressure compensating orifice can act with the effect of reducing a regulating hysteresis of the positioning servo arrangement and/or can reduce a regulating travel play of the positioning servo arrangement.

According to current knowledge, the observed modification, particularly the improvement in the response behavior of the positioning servo arrangement by means of the second pressure compensating orifice, is independent of the design of the positioning servo arrangement and especially of the control valve in particular. For example, the valve arrangement of the control valve may be capable of being adjusted as a function of the differential quantity into a third control state, in which the pressure-medium power cylinder arrangement is not connected either to the pressure-medium source or to the first pressure compensating orifice. Also, according to current knowledge, the modification or improvement in the response behavior by means of the second pressure compensating orifice is independent of the operating principle of the positioning servo arrangement and especially of the control valve.

In general, it is proposed that, in the case of a valve arrangement capable of being adjusted into the third control state, the second pressure compensating orifice permits the second pressure-medium pressure compensating flow in the third control state and preferably in the first control state and/or in the second control state, and that, in the case of a valve arrangement capable of being adjusted only between the first control state and the second control state, the second pressure compensating orifice permits the second pressure-medium pressure compensating flow at least in the first control state, preferably in the first control state and in the second control state.

The pressure medium may be a hydraulic or pneumatic pressure medium. In the case of a hydraulic pressure medium, the pressure-medium source is then in the form of a hydraulic source. In the case of a pneumatic pressure medium, the pressure-medium source is in the form of a pneumatic source. A pneumatic overpressure source is intended, in particular, here, which discharges a pressure higher than ambient pressure. However, a pneumatic underpressure source also comes under consideration, which serves for generating in the pressure-medium power cylinder arrangement an underpressure which is lower than ambient pressure.

It was possible to show the effectiveness of the idea of the invention, in terms of influencing and optimizing the positioning behavior of the positioning servo arrangement, by means of various positioning servo arrangements, especially by means of various control valves. Furthermore, it was possible to demonstrate the effectiveness of the idea of the invention by means of an electrically activated proportional valve, to which the desired value and the actual value detected by a displacement transducer were supplied electrically. A control valve of this type comprises at least one electromagnetically adjustable valve element, for example at least one solenoid-actuable valve element.

In order, for many operating states, to reduce a pressure-medium loss caused by the second pressure compensating orifice, the second pressure compensating orifice may be capable of being selectively activated and deactivated. The pressure-medium power cylinder arrangement is preferably a single-acting pressure-medium power cylinder arrangement which cooperates, for example, with a spring arrangement, for example a diaphragm spring of the friction clutch, said spring arrangement being assigned to the disengagement bearing arrangement. However, the pressure-medium power cylinder arrangement may also be a double-acting pressure-medium power cylinder arrangement. It is proposed, for this purpose, that the second pressure compensating orifice be assigned or may selectively be assigned a pressure-medium chamber, assigned to a disengagement of the friction clutch, or a pressure-medium chamber, assigned to an engagement of the friction clutch, of the pressure-medium power cylinder arrangement. Alternatively, it is possible that the pressure-medium chamber assigned to engagement and the pressure-medium chamber assigned to disengagement be assigned in each case its own second pressure compensating orifice capable, if desired, of being selectively (preferably reciprocally) activated and deactivated.

In general, in light of the desired positioning behavior, the second pressure compensating orifice should have a flow cross section which is coordinated with a narrowest flow cross section (supply flow cross section) in the pressure-medium system connecting the pressure-medium source to the pressure-medium power cylinder arrangement and/or with a cylinder volume (if appropriate, a cylinder volume range) of the pressure-medium power cylinder arrangement and/or with a characteristic pressure-medium pressure level prevailing in the pressure-medium power cylinder arrangement when the positioning servo arrangement is in an actuating state, for example in order to achieve a desired driving behavior of the motor vehicle, preferably a desired maneuvering behavior of the motor vehicle.

For many practical situations and designs of the actuating device, in the case of a pneumatic pressure medium a flow cross section of about 0.4 mm to about 0.8 mm, preferably of about 0.6 mm, of the pressure compensating orifice would seem to be advantageous, for example in conjunction with a cylinder volume of about 0.3 l to about 0.8 l and a narrowest supply flow cross section of about 4 mm to about 10 mm, preferably of about 7 mm, and/or a pneumatic pressure which, when the positioning servo arrangement is in an actuating state, is in the range of about 2.5 to about 3.5 bar in the pressure-medium power cylinder arrangement designed as a pneumatic power cylinder arrangement. In the case of a different cylinder volume and/or in the case of a different narrowest supply flow cross section and/or in the case of a different pneumatic pressure range, the flow cross section of the second pressure compensating orifice may be adapted, preferably in such a way that a corresponding positioning behavior is achieved.

The second pressure-medium pressure compensating flow may profitably be used for other purposes, for example as a cooling flow or dust protection flow. The first pressure compensating flow may be used correspondingly. It is accordingly proposed that guide means be provided for guiding the second and/or the first pressure compensating flow to at least one assigned point of the actuating device, the friction clutch or the motor vehicle, in order to serve at the assigned point as a treatment flow and/or auxiliary flow, for example as a cooling flow or dust protection flow. The idea of which is independent of the presence or absence of a second pressure compensating orifice. It would also be conceivable to provide, instead of a pressure compensating flow interrelated with the functioning of the positioning servo arrangement, a pressure-medium flow which serves, uncited, as a treatment flow and/or auxiliary flow and which is provided by the pressure-medium system and is not necessarily interrelated with or does not necessarily influence the functioning of the positioning servo arrangement. The idea of this embodiment is accordingly independent of the functioning and makeup of the actuating device; it is sufficient, in principle, that the actuating device have a pressure-medium power cylinder arrangement capable of being connected to a pressure-medium source.

The invention relates furthermore, in general terms, to an actuating and/or positioning device, comprising a servo arrangement with a pressure-medium power cylinder arrangement which acts on at least one element to be actuated and/or to be positionable and which is capable of being actuated, via a control valve connected to a pressure-medium source, as a function of a command quantity representing a desired position or a desired actuating state and of an actual quantity representing an actual position or an actual actuating state of the element. The control valve comprises a valve arrangement which is capable of being adjusted between a first control state connecting the pressure-medium power cylinder arrangement to the pressure-medium source and a second control state connecting the pressure-medium power cylinder arrangement to a first pressure compensating orifice and is capable of being changed over between the two control states as a function of the actual quantity and of the command quantity, preferably as a function of a differential quantity assigned to the actual quantity and to the command quantity.

There is provision, according to the invention, for providing, in a pressure-medium subsystems comprising the pressure-medium power cylinder arrangement or the control valve, a second pressure compensating orifice which, at least when the servo arrangement is in a holding state, permits a defined second pressure-medium pressure compensating flow smaller than a first pressure-medium pressure compensating flow permitted by the first pressure compensating orifice in the second control state, in order to influence at least one positioning and/or actuating behavior of the servo arrangement. The actuating and/or positioning device may have further features of the above-described actuating device relating to a friction clutch, the positioning servo arrangement corresponding to the servo arrangement and the disengagement bearing arrangement corresponding to the element to be actuated and/or to be positioned.

The invention is explained in more detail below by means of several exemplary embodiments shown in the figures and by means of measurement results determined during tests.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
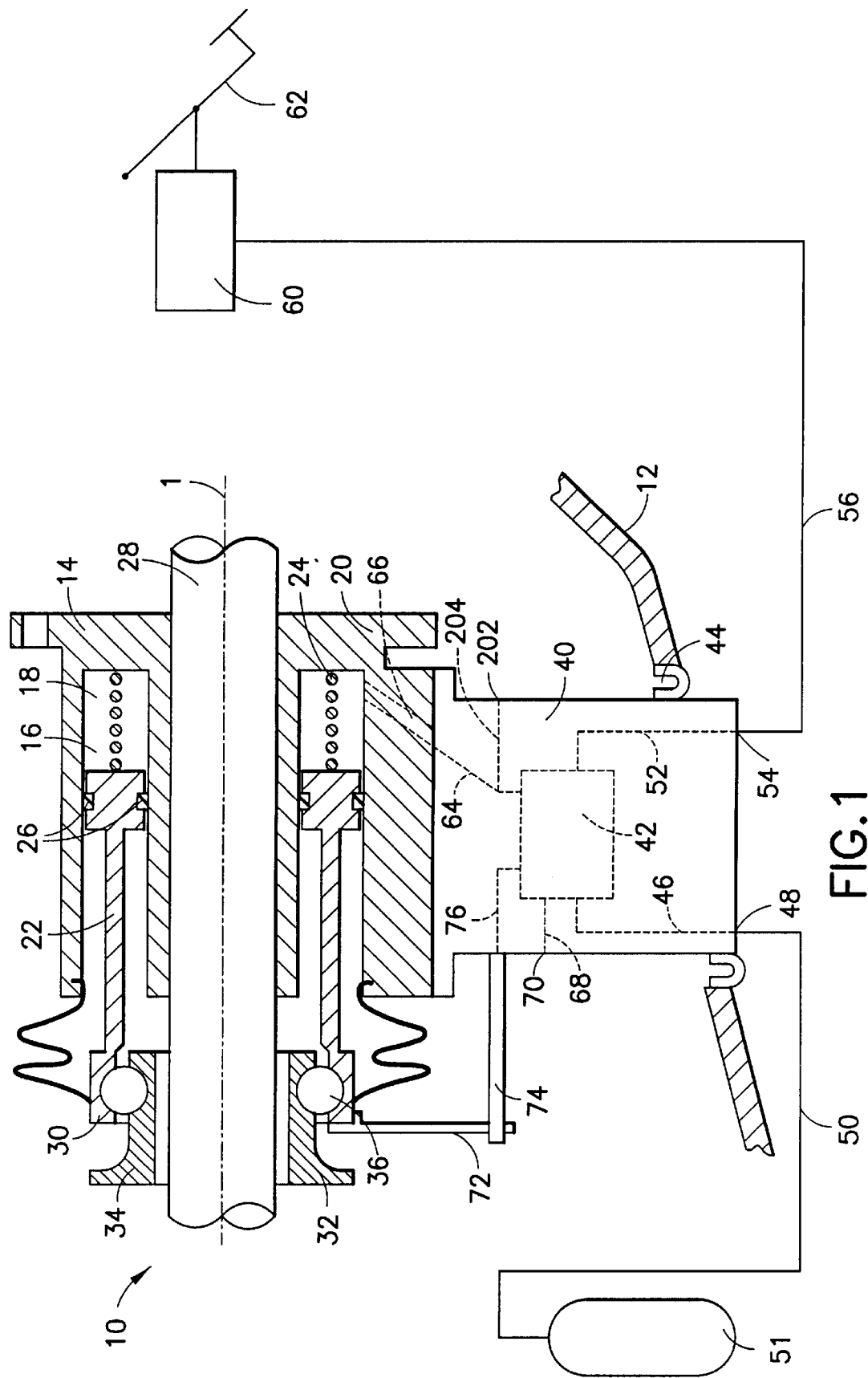
FIG. 1 shows a diagrammatic, partially sectional view of an actuating device according to the invention with a pressure-medium power cylinder arrangement in the form of an annular pressure-medium cylinder, in particular an annular pneumatic cylinder.

FIG. 1 shows diagrammatically an actuating device 10 according to the invention for a friction clutch, here a pressed clutch, arranged in a bell-shaped housing 12 in the drive train of a motor vehicle between an internal combustion engine and a gear unit. The actuating device 10 comprises a pressure-medium power cylinder arrangement 14, here a pneumatic power cylinder arrangement, which is designed as a structural unit and which is also designated hereafter as an actuating cylinder structural unit. The actuating cylinder structural arrangement 14 comprises an annular pressure-medium cylinder, here an annular pneumatic cylinder 16, which is formed by an annular-cylindrical recess 18 in a stationary body part 20 and by an annular pneumatic piston element 22. The annular pneumatic piston element 22 is prestressed (to the left in FIG. 1) by spring means 24 in the direction of the clutch which is not shown and carries sealing rings 26 for sealing off the annular-cylindrical space of the annular pneumatic cylinder 16.

The annular pneumatic cylinder 16 and the annular pneumatic piston element 22 are arranged coaxially to a clutch axis A. The body part 20 has an axial bore, through which the gear input shaft 28 extends coaxially to the clutch axis A.

An annular portion of the annular pneumatic piston element 22 at the clutch-side end of the annular piston element forms a disengagement ring 30 of a disengagement bearing arrangement 32 which comprises, furthermore, a disengagement ring 34 rotatable relative to the disengagement ring 30 and co-rotating with the clutch and a ball bearing 36 allowing relative rotation between the two disengagement rings 30, 34. During the actuation of the actuating device 10, the disengagement bearing arrangement 32 acts in a known way, in particular via diaphragm spring tongues, on the clutch, in order to disengage the clutch so as to interrupt the force flux between the gear unit and the internal combustion engine.

The actuating cylinder structural unit 14 carries a control valve structural unit 40 which is fastened releasably to the actuating cylinder structural unit 14 and this comprises a control valve 42 shown merely diagrammatically in FIG. 1. The control valve structural unit 40 is arranged in such a way that it projects through an assigned orifice 44 in the bell-shaped housing 12 beyond the outer face of the housing and can be removed while the bell-shaped housing is still connected to the internal combustion engine and the gear unit.

The control valve 42 is connected to a pneumatic source 51 via a pneumatic line 46 within the control valve structural unit 40, via a pneumatic connection 48 on that portion of the control valve structural unit which projects beyond the outer face of the bell-shaped housing 12 and via a further pneumatic line 50. Furthermore, the control valve 42 is connected to a command-signal generator unit 60 via a line 52 within the control valve structural unit 40, via a connection 54 on that portion of the control valve structural unit 40 which projects beyond the outer face of the bell-shaped housing 12 and via a further line 56. In the present case, the command-signal generator unit 60 is a clutch pedal arrangement 60 with a clutch pedal 62. The arrangement is designed for transmitting a command signal in the form of a hydraulic signal to the control valve 42 via the line 56, the connection 54 and the line 52. The lines 52, 56 are accordingly hydraulic lines which are connected via the connection 54 designed as a hydraulic connection.

Furthermore, the control valve 42 is connected to the annular-cylindrical space of the annular pneumatic cylinder 16 via a pneumatic line 64 within the control valve structural unit 40 and via a pneumatic line 66 within the actuating cylinder structural unit 14. Moreover, the control valve 42 is connected, via a pneumatic line 68 within the control valve structural unit 40, to a pressure compensating orifice 70 in the clutch-side surface of the control valve structural unit.

The instantaneous axial position of the disengagement bearing arrangement 32 is supplied to the control valve 42, via mechanical coupling elements 72, 74, in the form of an actual-value signal representing a travel, as illustrated diagrammatically by the dashed connection 76 within the control valve structural unit 40.

According to design variants known from DE 197 16 641 A1 (reference document 2) and DE 198 00 232 A1 (reference document 4), the actual-value signal is a mechanical signal. For this purpose, the rod-like coupling element 74 projecting from the control valve structural unit 40 may be motionally coupled to a valve element of a valve arrangement comprising two valve elements. Of the two valve elements, a first valve element may be assigned to the command-signal generator unit 60 and a second (the already mentioned) valve element may be assigned to the disengagement bearing arrangement and be motionally coupled to the latter via the coupling elements 72 and 74 in terms of the axial movement of the disengagement bearing arrangement. The two valve elements, mounted so as to be moveable relative to one another and relative to the control valve structural unit 40, serve for implementing various control states of the control valve 42. Attention is drawn to reference documents 2 and 4 as regards preferred embodiments of the control valve 42.

The control valve 42 changes over between three control states as a function of the command signal, which is emitted by the command-signal generator unit 60 and predetermines a desired axial position of the disengagement bearing arrangement 32, and of the actual-value signal, which indicates the instantaneous axial position of the disengagement bearing arrangement 32. In a first control state, a pneumatic connection between the annular pneumatic cylinder 16 and the pneumatic source 51 is made via the control valve 42, so that pneumatic medium, here compressed air, is supplied to the annular pneumatic cylinder by the pneumatic source 52 and correspondingly disengages the annular pneumatic piston element 22 from the recess in the direction of the clutch. In a second control state of the control valve 42, a pneumatic connection between the annular pneumatic cylinder 16 and the pressure compensating orifice 70 is made via the control valve 42, so that the disengaged annular pneumatic piston element 22 is re-engaged into the recess 18 by means of the pressure force of the main clutch spring, for example a diaphragm spring or the like, the compressed air located in the annular-cylindrical space of the annular pneumatic cylinder 16 flowing out of the pressure compensating orifice 70. In a third control state, the annular-cylindrical space of the annular pneumatic cylinder 16 is closed off in an essentially pneumatically leaktight manner, with the exception of an additional pressure compensating possibility yet to be explained, provided by a second pressure compensating orifice according to the invention, so that the annular pneumatic piston element 22 maintains or changes its instantaneous axial position according to this additional pressure compensating possibility. The influence of this additional pressure compensating possibility is not yet taken into account in the following description of the functioning of the various control valves, until the pressure compensating orifice according to the invention and the additional pressure compensating possibility are discussed in detail.

The control valve 42 can form, with its valve elements, the pneumatic power cylinder arrangement 14, the coupling element 72 constituting a generator element for the actual-value signal and the coupling element 74, a mechanical position regulating arrangement which, by virtue of an appropriate changeover between the three control states, sets the axial position of the disengagement bearing arrangement 32 to the desired position indicated by the command signal from the command-signal generator unit 60. For this purpose, according to the design variants mentioned, the instantaneous position of the disengagement bearing arrangement 42, as the actual quantity, is represented by the position of the second valve element and the desired position of the disengagement bearing arrangement, as the command quantity, is represented by the position of the first valve element. The actual quantity and the command quantity are assigned a differential quantity which is represented by the position of the first and of the second valve elements relative to one another and which assumes the value zero when the actual axial position of the disengagement bearing arrangement 32 corresponds to the desired position.

According to design variants known from German reference DE 197 16 600 A1 (reference document 1) and German reference DE 197 14 226 A1 (reference document 3), the control valve operates on the pressure balance principle. Attention is drawn to FIG. 2 in which analogous components are designated by the same reference symbols as in FIG. 1.

The control valve 42 comprises a valve body 170 which is mounted displaceably along a valve axis in a bore of the control valve structural unit 40 and which has an axial bore, not shown, capable of being closed relative to the pneumatic line 46 by means of a cover element 172, and radial bores which issue into the axial bore and of which a radial bore 174 can be seen in FIG. 1.

Figure 2:
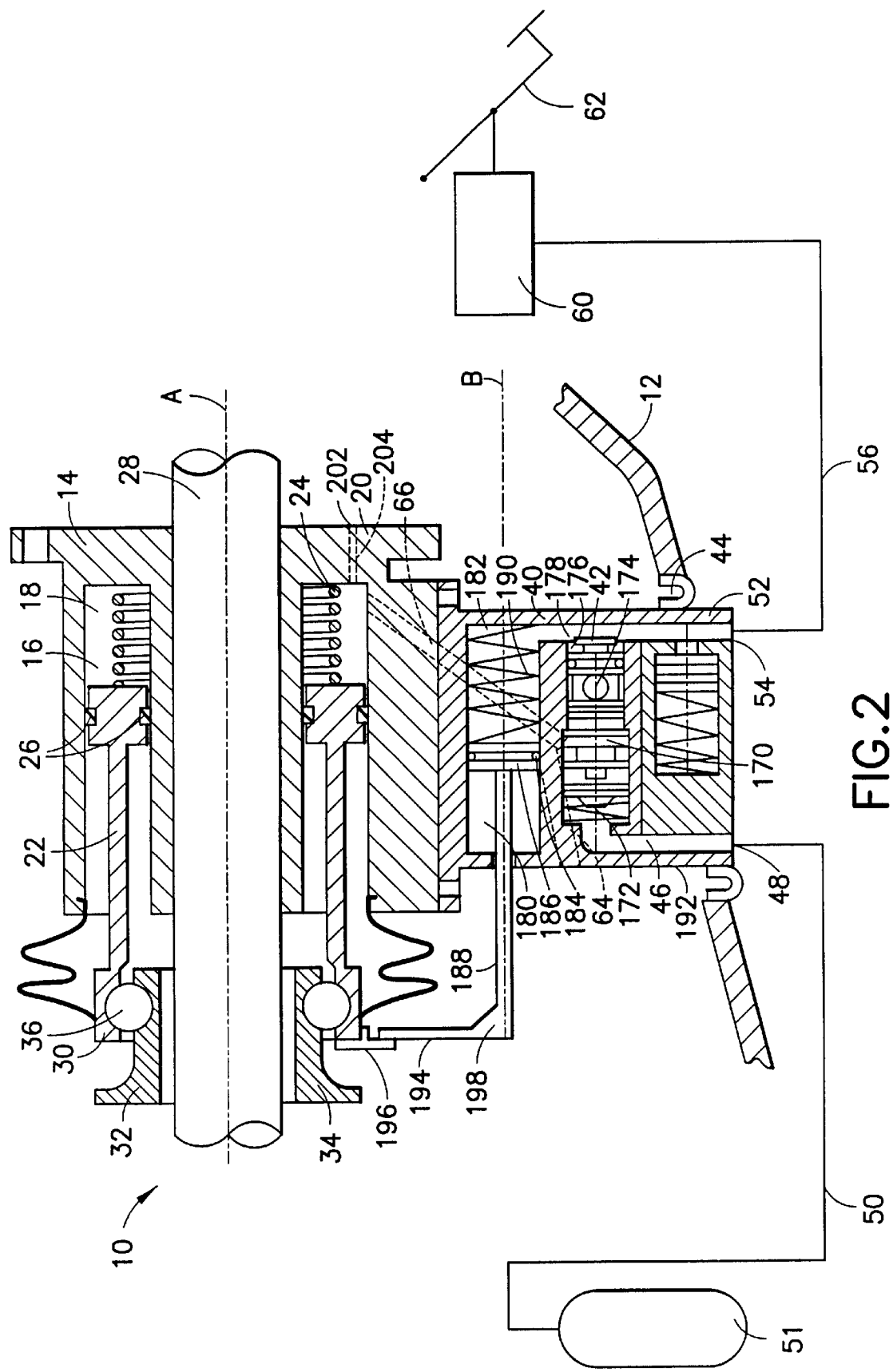
FIG. 2 shows an advantageous embodiment of the actuating device according to FIG. 2 with a control valve of the "pressure balance" type.

In FIG. 2, the valve body is displaced to the right relative to the cover element 172 under the action of a compression spring engaging on said valve body, so that a venting connection between the annular-cylindrical space of the annular pneumatic cylinder 18 and the venting orifice 70 is made via the pneumatic lines 66, 64, a valve space receiving the valve body 170, said axial bore and said radial bores in the valve body. When the valve body 170 is displaced to the left such that the cover element 172 closes the axial bore, but is not yet lifted off from a cover seat counter to the spring force, acting on said cover element, of an assigned compression spring, the annular space of the annular pneumatic cylinder is closed off in an essentially pneumatically leaktight manner, with the exception of the additional pressure compensating possibility yet to be explained, provided by a (second) pressure compensating orifice according to the invention. When the valve body 170 is moved further to the left, at the same time taking up the cover element 172 so as to lift off the cover element from its cover seat, an aerating connection between the pneumatic line 46 and the annular space 18 of the annular pneumatic cylinder 16 is made via the valve space and the pneumatic lines 64 and 66.

The position of the valve body 170 which is set in each case depends on the hydraulic pressure in a hydraulic chamber 176, formed by a hydraulic line portion, of the control valve 42, said hydraulic pressure acting on the valve body 170 in the direction of a displacement of the valve body to the left counter to the spring force of the compression spring engaging on the valve body 170. The hydraulic chamber 176 is connected via a hydraulic line portion 178 to the cylindrical space 180 of a hydraulic measuring cylinder 182. The measuring cylinder 182 comprises, on a piston rod 188, a piston 186 provided with a sealing ring 184. The piston delimiting the cylindrical space of the hydraulic measuring cylinder 182 is displaceable along a movement axis B parallel to the clutch axis A and coaxial to the piston rod 188 and is prestressed by a compression spring 190 in the direction of the clutch, that is to say in the disengagement direction of the disengagement bearing arrangement 32 when the clutch is actuated so as to disengage it. The piston rod 188 projects through an orifice in the control valve structural unit 40, via a body or a housing 192 of the control valve structural unit 40, in the direction of the clutch and, at its clutch-side end, has a follower element 194 produced in one piece with the piston rod 188 and taking the form of a rod-shaped arm projecting from the piston rod 188 in the direction of the clutch axis A. The piston rod 188, the follower element 194 and the piston 186 may be interpreted as parts of an integral or even one-piece generator element of a generator element arrangement formed by the hydraulic measuring cylinder 182.

The annular portion 30 of the annular pneumatic piston element 22 carries a rigidly fastened driver 196 with a radially outward-projecting driver arm, against which the follower element 194 is prestressed with a free end portion by means of the pressure force of the compression spring 190. The driver arm 196 thus forms an abutment for the follower element 194. During the disengagement of the annular pneumatic piston element 22, the generator element 198 formed by the piston 186, the piston rod 188 and the follower element 194 follows the movement of the annular pneumatic piston element 22 to the left under the action of the compression spring 190. During the engagement of the annular pneumatic piston element 22, the piston element 22 presses via the driver 196 against the generator element 198 and drives the generator element 198 in its movement to the right. The generator element 198 and the annular pneumatic piston element 122 are therefore motionally coupled to one another for movement in the axial direction. The axial movement of the annular pneumatic piston element 22 is thus converted into an increase in volume or a decrease in volume of the cylindrical space of the hydraulic measuring cylinder 182. As a result, the axial position of the annular pneumatic piston element 22 and consequently of the disengagement bearing arrangement 32 is fed back to the control valve 42. The hydraulic pressure in the hydraulic chamber 176 thus depends, on the one hand, on the hydraulic-medium volume displaced in the command-signal generator unit as a result of the actuation of the clutch pedal 62 and, on the other hand, on the hydraulic-oil volume received in the cylindrical space of the hydraulic measuring cylinder 182 and consequently on the axial position of the disengagement bearing arrangement 32. The control valve 42 is designed in such a way that, by the appropriate aeration and venting of the annular-cylindrical space of the annular pneumatic cylinder 16 during clutch actuation, an approximately constant hydraulic-medium pressure is always maintained in the hydraulic chamber 176. Attention is drawn additionally to reference document 1 as regards the functioning of the control valve. If desired, an excessive rise in the hydraulic-medium pressure can be prevented by means of a pressure-limiting cylinder or the like integrated into the control valve structural unit 40 (FIG. 2) or provided at another point, in order to avoid damage.

Abstracting from the design variants according to FIG. 1 and FIG. 2, FIG. 3 shows a preferred embodiment of an actuating device according to the invention in a diagrammatic illustration depicting preferred operating principles and implementing possibilities. In addition to the actual power cylinder arrangement 14, the actuating device comprises the already-mentioned control valve 42 which actuates the power cylinder arrangement 14 as a function of a command quantity via a connecting section y (regulating quantity Y). The command quantity is derived from a command signal W which, in the example shown, is supplied to the control valve 42 by the clutch pedal 62 via a connecting section w. As a generalization in comparison with the exemplary embodiments of FIGS. 1 and 2, converter means 100 could be assigned to the corresponding signal connection 54 of the control valve in order to convert the command signal W into the command quantity.

The activation of the power cylinder arrangement 14 takes place as a function of the command quantity representing the desired position of the disengagement bearing arrangement and of an actual quantity representing the actual position of the disengagement bearing arrangement. The actual quantity is derived from an actual-value signal X which is supplied to the control valve 42 via a connecting section x by a generator element arrangement 200 assigned to the disengagement bearing arrangement. As a generalization in comparison with the exemplary embodiment of FIG. 1, converter means 104, which serve for converting the actual-value signal X into the actual quantity, may likewise be assigned to the corresponding signal connection 102 of the control valve 42.

The control valve 42, the power cylinder arrangement 14, the generator element arrangement 200 (comprising, for example, the hydraulic measuring cylinder 182 and the generator element 198) assigned to the disengagement bearing arrangement and the sections x, y preferably form a control loop which regulates the position of the disengagement bearing arrangement according to the instructions of the command signal W. In the exemplary embodiments according to FIGS. 1 and 2, regulation takes place by the changeover of the control valve 42 between three valve states, namely a filling control state I, in which the pressure-medium source (here the pneumatic source) is connected to the power cylinder arrangement 14 via the valve connections 48 and 106, an emptying control state II, in which the power cylinder arrangement 14 is connected to a compensating volume (in particular, the atmosphere) via the valve connections 106 and 108, and a holding control state III, in which the pressure medium cannot escape from the power cylinder arrangement 14 via the valve connection 108 of the control valve 42. It may be noted that a separate holding control state of the control valve is not absolutely necessary. Insofar as a specific holding control state of the control valve is provided, this may also be implemented by a continuous changeover between the filling connection 48-106 and the emptying connection 106-108. If no specific holding control state of the control valve is provided, there will still be the "holding" function of the actuating device, in that, to be precise, in some operating states, there is a continuous changeover of the control valve between the filling control state I and the emptying control state II.

As a generalization in comparison with the exemplary embodiments of FIGS. 1 and 2, both the command signal W indicating the desired position and the feedback or actual-value signal X may be implemented independently of one another by means of any suitable types of signal. The signals may in each case be hydraulic, pneumatic, mechanical, electrical or optical signals, to name only the most important types of signal. Depending on the type of signal, the respective signal may be represented by a pressure, a volume, a force, a travel, an angle, a current, a voltage or a light intensity, again to name only the most important physical signal representations. It is important that the command signal W and the actual-value signal X can also be signals of a different type or that the command signal W and the actual-value signal X can be represented by different physical quantities. If the command signal W and the actual-value signal X are of different type or are represented by different physical quantities, conversion of the signals into identical quantities (command quantity or actual quantity) can be carried out by said converter means 100 and 104. As regards the actual-value signal X, it may be pointed out that the type of signal provided in each case is independent of the generator element arrangement provided for recording the axial position of the disengagement bearing arrangement. Thus, a particular generator element arrangement exerting forces on the disengagement bearing arrangement or the annular piston element, for example a generator element arrangement with a hydraulic measuring cylinder, as in the exemplary embodiment of FIG. 2, or a purely mechanical generator element arrangement with converter means generating a nonhydraulic or a nonmechanical signal supplied to the control valve may be provided.

A differential quantity determining the control state of the control valve 42 may be derived from the actual quantity and the command quantity. In the example shown, the control valve assumes the filling control state I when the command quantity is higher than the actual quantity and the emptying control state II when the command quantity is lower than the actual quantity. When the command quantity is equal to the actual quantity, the control valve 42 of the exemplary embodiment of FIG. 3a assumes the holding control state III.

As a generalization in comparison with the exemplary embodiments of FIGS. 1 and 2, the actual quantity, the command quantity and, if appropriate, the differential quantity may in each case be a hydraulic, pneumatic, mechanical or electrical quantity, in particular a pressure, a volume, a force, a travel, an angle, a current or a voltage or else merely a computing quantity which, preferably with corresponding digitization, is present in storage regions of an electronic control device, in particular a microprocessor, of the control valve.

It is often expedient, in practice, if there is no linear relationship between the command signal W and the axial position of the disengagement bearing arrangement which is set by the control or regulation of the control valve 42. For example, it is advantageous, for sensitive manual clutch engagement as a result of the appropriate actuation of the clutch pedal 62, if a middle desired-position range of the clutch, which is limited by a position of commencing torque transmission S and a position EK engaged for essentially maximum torque transmission, is spread in the assigned command signals W, as compared with the other desired-position ranges. A corresponding positioning characteristic curve, which assigns a desired axial position W' to each command signal W, is shown in FIG. 3b.

It should also be mentioned that the control valve 42 and the pressure-medium power cylinder arrangement, in particular the pneumatic power cylinder arrangement 14, may be interpreted as parts of a positioning servo arrangement of the actuating device, in which the term "servo" is to be understood as comprising an actuation of the friction clutch both on the basis of an "external force" and on the basis of an "auxiliary force" (auxiliary-force assistance or auxiliary-force actuation). Thus, it is possible for actuation by means of the pressure-medium power cylinder arrangement to be the only possibility for actuating the friction clutch. It is also possible, however, for there to be further or additional possibilities for actuating the friction clutch, for example by means of an additional hydraulic cylinder arrangement which serves, if desired, as a hydraulic measuring cylinder arrangement along the lines of the hydraulic measuring cylinder 182 (FIG. 2). In this way, for example, emergency actuation of the clutch can be provided when actuation via the pressure-medium power cylinder arrangement is not possible, for example because of a lack of pressure medium. Attention is drawn, in this connection, especially to reference document 1.

Figure 3A:
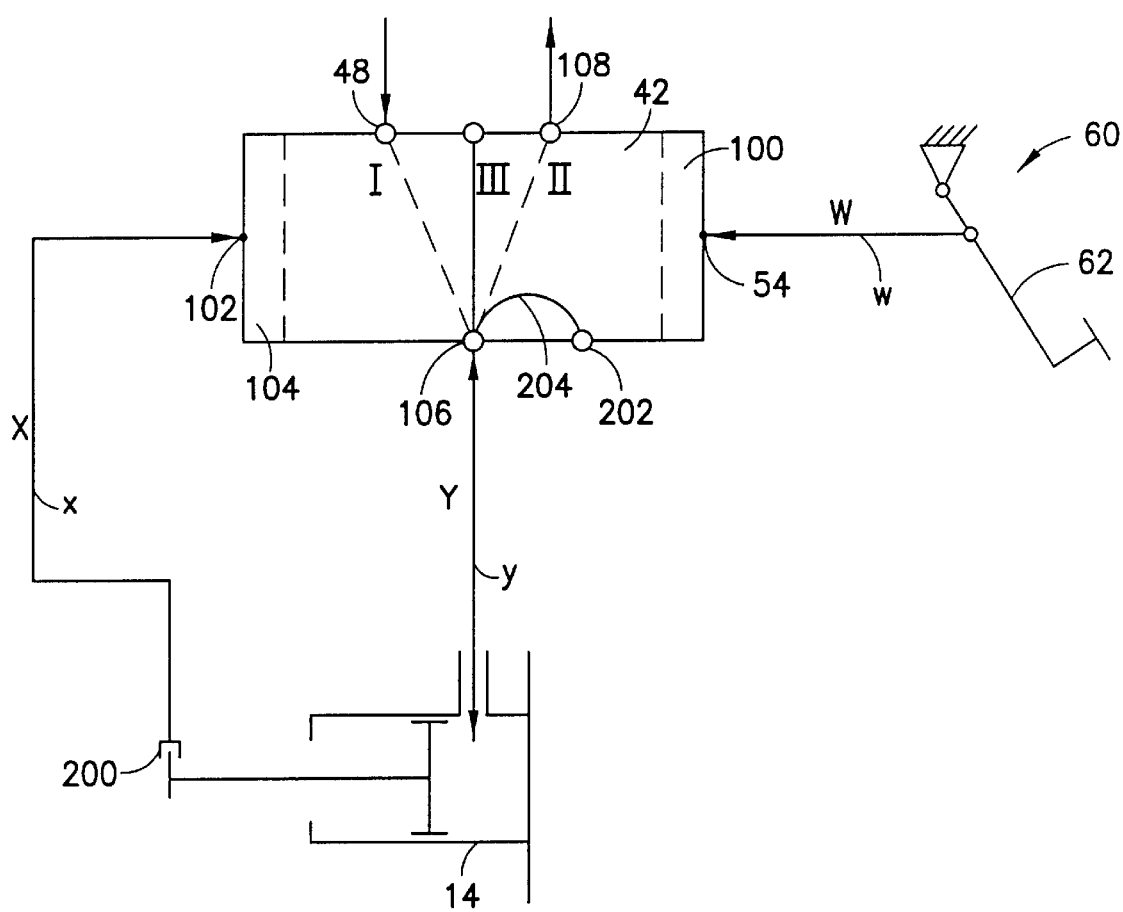
FIG. 3 shows diagrammatically, in part FIG. 3a, the control loop of an actuating device according to the invention, implementing a preferred fundamental design principle, with a positioning regulating device, and, in part FIG. 3b, a command-signal/desired-position positioning characteristic curve, according to which the positioning of the disengagement bearing arrangement of the actuating device of part FIG. 3a can be carried out.
Figure 3B:
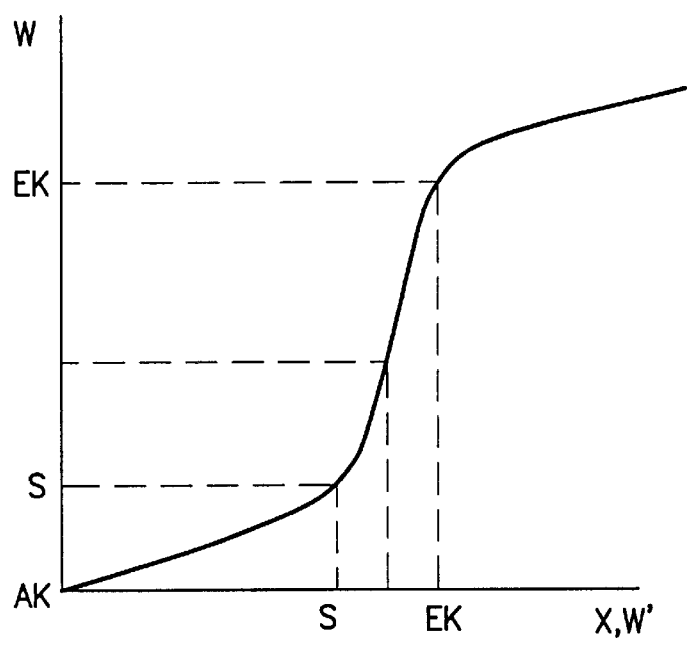

In addition to the pressure compensating orifice 70 illustrated in FIG. 1 or to a corresponding pressure compensating orifice not illustrated in FIGS. 2 and 3 (connected to or formed by the valve connection 108 in the case of FIG. 3), which is designated hereafter as the first pressure compensating orifice and, when the control valve is in the second control state, permits a first pressure-medium pressure compensating flow (a pneumatic pressure compensating flow in the case of the exemplary embodiments), there is provided according to the invention, in a pressure-medium subsystem comprising the pressure-medium power cylinder arrangement (if appropriate, pneumatic power cylinder arrangement) and the control valve, a second pressure compensating orifice which, at least in the third control state of the control valve (or, more generally, at least in a holding state or positioning servo arrangement), permits a defined second pressure-medium pressure compensating flow (pneumatic pressure compensating flow in both exemplary embodiments) which is lower than the first pressure-medium pressure compensating flow. The second pressure compensating orifice is designated by 202 in FIGS. 1 to 3a. In the case of FIG. 1, the second pressure compensating orifice 202 is formed by an orifice in the clutch-distant surface of the control valve structural unit 40, said orifice being connected to the pneumatic line 64 via a pneumatic line 204. In the case of FIG. 2, the second pressure compensating orifice 202 is provided in the actuating cylinder structural unit 14 and is connected to the annular pneumatic cylinder 16 via a pneumatic line 204. In the case of FIG. 3a, the second pressure compensating orifice 202 is formed in the control valve 42 and is permanently connected, within the valve, to the valve connection 106 via a connection 204. If desired, the connection 204 between the valve connection 106 and the second pressure compensating orifice 202 could also be designed so as to be capable of being changed over between a connecting state and a nonconnecting state. The same applies accordingly to second pressure compensating orifices which are located at another point and which may be assigned, if desired, a switching valve capable of being changed over between a passing state and a blocking state.

By means of the second pressure compensating orifice, which, in the exemplary embodiments shown, is connected, in all three control states (I, II, III) of the control valve, to the annular pneumatic cylinder 16 or, in general, to the pressure-medium power cylinder arrangement 14 and acts in the same way as a desired leakage of the pneumatic system on the pneumatic-cylinder side, a significant improvement in the positioning and actuating behavior of the actuating device according to the invention is achieved, as compared with comparable actuating devices without a second pressure compensating orifice of this kind. Thus, for example, the minimum regulating increment of the actuating device can be reduced from about 2% of the overall stroke without a second pressure compensating orifice to about 0.5% of the overall stroke by means of the "leakage" made possible by the second pressure compensating orifice. Without the second pressure compensating orifice, even regulating increments of 3% of the overall stroke are sometimes executed inaccurately.

Figure 4:
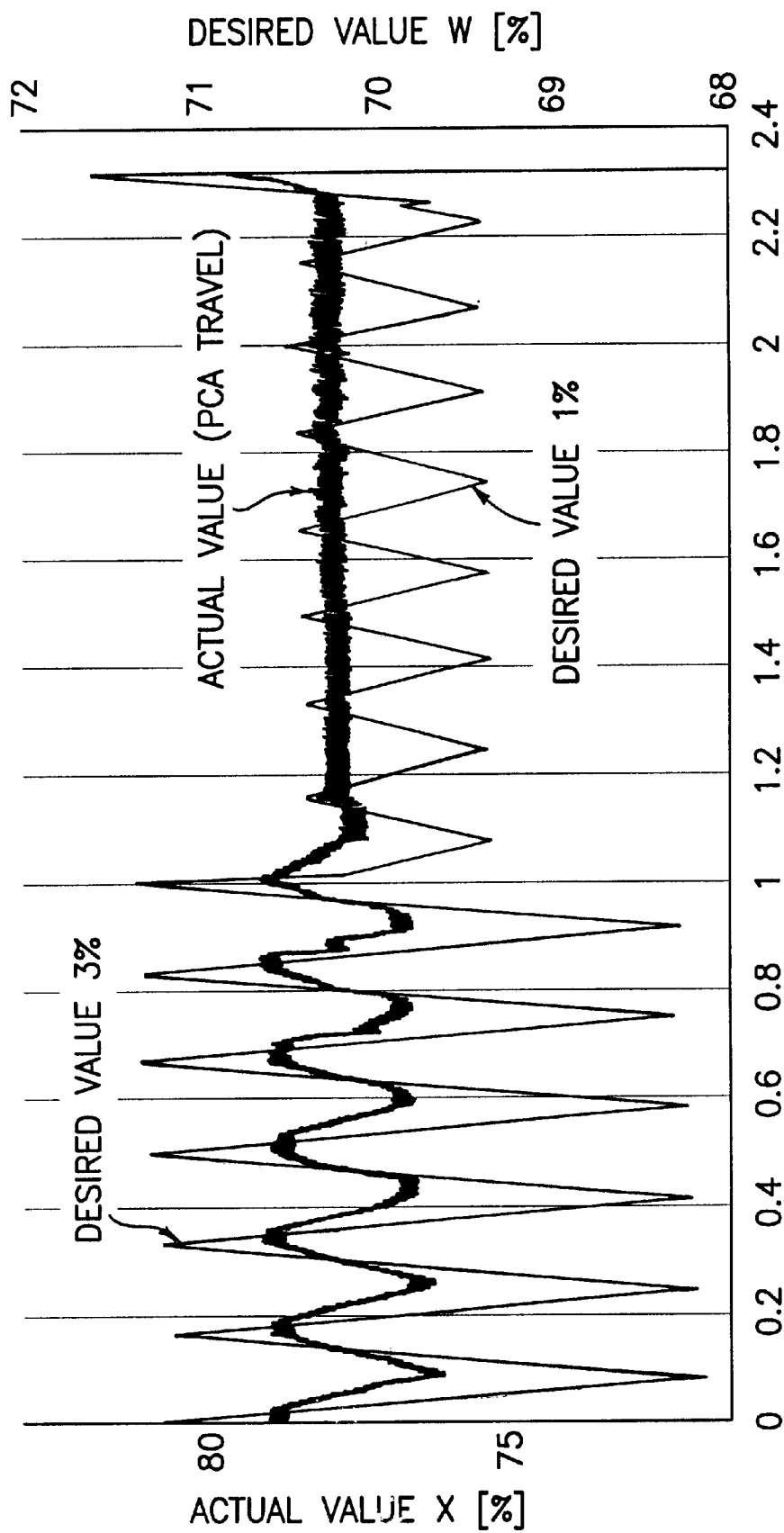
FIG. 4 shows a minimum regulating increment of an actuating device having an electric control valve, without measurement results relating to a second pressure compensating orifice according to the invention.
Figure 5:
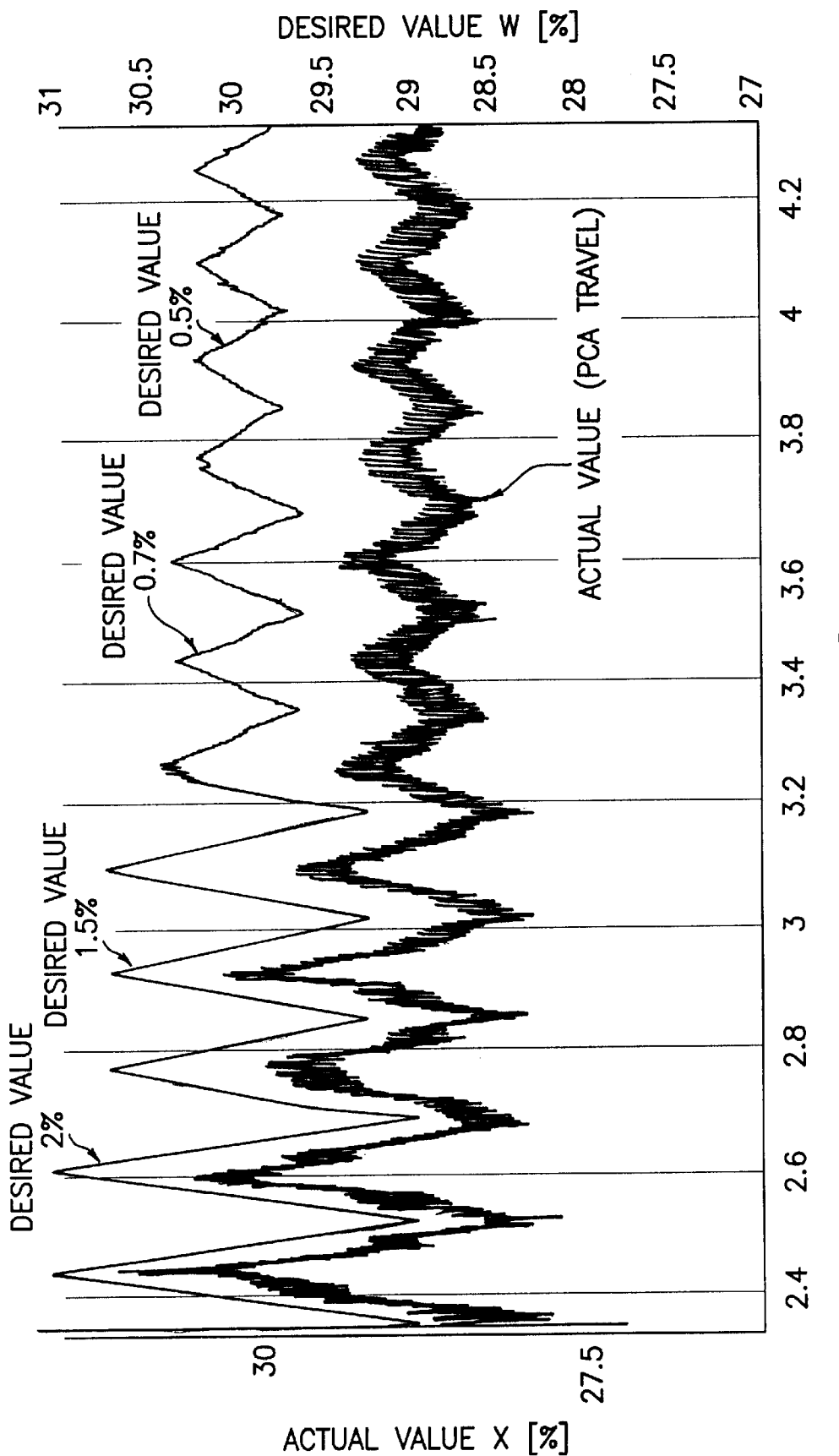
FIG. 5 shows measurement results relating to the minimum regulating increment, for the actuating device assigned to FIG. 4, in the case of an introduction of a second pressure compensating orifice according to the invention with a flow cross section of 0.6 mm.

The minimum regulating increment can be determined by modulating the desired value, the stroke of desired-value modulation being reduced until the resulting actual value can no longer accurately follow the desired value or even no longer exhibits any modulation. In tests, in which the second pressure compensating orifice was provided in the form of a leakage bore with a diameter of 0.6 mm, through which compressed air could escape from the cylinder during clutch actuation, desired-value changes of 0.5% of the overall stroke were still executed accurately by the actuating device. Attention is drawn, in this respect, to exemplary measurement results which are shown in FIGS. 4 and 5. The measurements were conducted on an actuating device with an electrical control valve, specifically with an electrically activated proportional valve, which received the desired value as an electrical signal and the actual value as an electrical signal (from a displacement transducer assigned to the disengagement bearing). FIG. 4 shows a modulation of the desired value with a stroke of 3% of the maximum overall stroke (here, a maximum overall stroke of 12 mm corresponding to a 100% desired-value change) and a modulation of the desired value with a stroke of 1% of the maximum overall stroke and also the resulting modulation of the actual value along a time axis in the case of a measuring situation without a second pressure compensating orifice. As may be seen in the figure, even during the modulation of 3% the actual value can follow the desired value only incompletely, since the modulation peaks of the desired value are clipped in the actual value. The modulation of 1% can no longer be seen in the actual value. Only interference with a frequency higher than the modulation of the desired value is revealed in a part of the measuring curve on the right.

By the introduction of a second pressure compensating orifice formed, for example, by a 60-fold spray nozzle and having a diameter (flow cross section) of 0.6 mm, the positioning behavior is appreciably improved in terms of the minimum regulating increment, as may be seen from the measurement results of FIG. 5. The actual value (PCA travel; PCA=Pneumatic Clutch Actuator) can satisfactorily follow the modulations of the desired value with a modulation stroke of 2%, 1.5%, 0.7% and 0.5% of the maximum overall stroke, without the modulation peaks being clipped.

In the measurements, a pneumatic cylinder with a cylinder volume of the order of magnitude of about 0.75 l was used, and a narrowest inflow-line cross section determining a maximum pneumatic-medium flow to the control valve amounted to about 6 to 7 mm.

In addition to the reduction in the minimum regulating increment of the actuating device, as explained with reference to FIGS. 4 and 5, the second pressure compensating orifice significantly improves the meterability of clutch actuation, in that the play in the control valve is greatly reduced. As a result, for example, proportionality between a clutch pedal possibly provided and the transmission torque can be achieved. A direct relation between the movement of the clutch pedal and the movement of the vehicle is therefore possible, so that, in a similar way to when the clutch is actuated purely mechanically in the conventional way, the vehicle as it were "hangs" on the clutch pedal. Without a second pressure compensating orifice, a relationship occurs between the actual value (PCA travel) and the desired value (if appropriate, pedal travel), this relationship being shown diagrammatically in FIG. 6 and being characterized by pronounced hysteresis. The hysteresis curve width, designated by "play travel", depends on whether a second pressure compensating orifice is provided or not and on how great the second pressure-medium pressure compensating flow permitted by the second pressure compensating orifice is, that is to say on what flow cross section the second pressure compensating orifice has. As made clear in FIG. 6, the play travel, that is to say the hysteresis curve width, can be reduced substantially by the provision of the defined leakage ensured by the second pressure compensating orifice. The smaller the play, the more direct the response behavior of the actuating device (no or only a low phase/frequency characteristic of the actuating device). The meterability may be described by a characteristic quantity which is formed from the quotient of play travel to actuating travel. The smaller the characteristic quantity (if appropriate, indicated as a percentage), the smaller the play and the more directly the actual value follows the desired value. The characteristic quantity was reduced from about 22% in the clutch disengagement direction and about 20% in the clutch engagement direction for a conventional series actuating device to about 12% in the clutch disengagement direction and about 6% in the clutch engagement direction as a result of the introduction of a second pressure compensating orifice (60-fold spray nozzle) according to a the invention.

Figure 6:
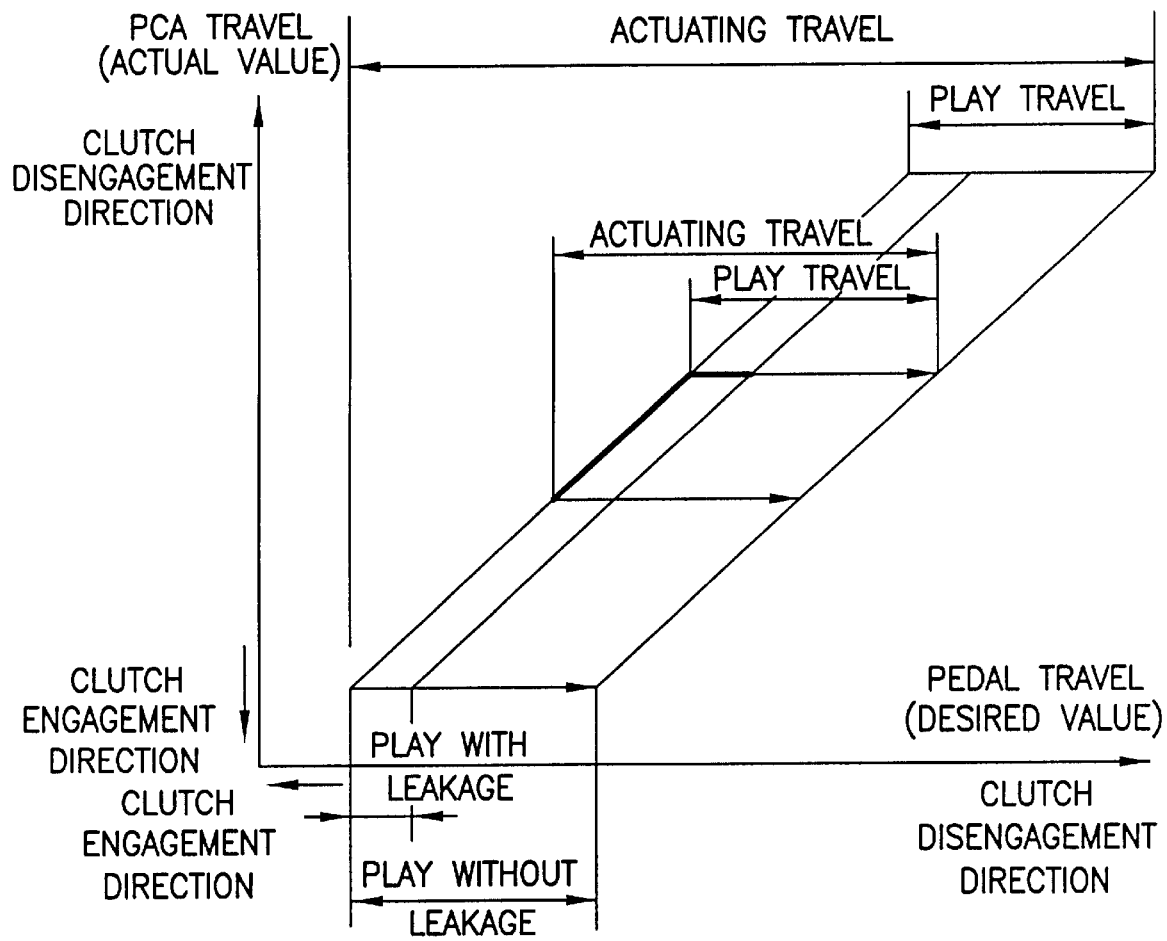
FIG. 6 shows a diagrammatic actual-value/desired-value characteristic curve of an actuating device with hysteresis behavior and regulating travel play and the improvements capable of being achieved by the introduction of defined leakage brought about by the second pressure compensating orifice according to the invention.

The hysteresis shown in FIG. 6 is a phenomenon which occurs independently of the time activation of the actuating device. The hysteresis in FIG. 6 is to be understood as describing a quasistatic behavior of the actuating device. The play therefore arises even when the actual value is given as much time as desired to follow the desired value. In addition to this hysteresis behavior, an actuating device of the type taken as a basis here also exhibits a dynamic behavior, in which case idle times may occur which lead to the actual value following the desired value only with a time delay. It was observed that even idle times of this kind can be reduced appreciably by the introduction of a second pressure compensating orifice.

The response behavior of an actuating device of the type taken as a basis here is determined essentially by static and sliding friction in the actuating device, including the pressure-medium power cylinder arrangement and the control valve. At least the static and sliding friction occurring in the control valve between valve elements, a valve housing and a sealing arrangement can be reduced substantially, in its effects on the positioning behavior of the actuating device, by means of the second pressure compensating orifice according to the invention, so that the advantages explained are afforded. This is generally true, irrespective of the makeup and functioning of the control valve. Thus, for example, a proportional seat valve, a clocked switching valve and a proportional slide valve may be used, in conjunction with the second pressure compensating orifice, as an electrical valve in an actuating device according to the invention. It is possible, furthermore, to use a hydraulic control valve of the pressure balance type in conjunction with the second pressure compensating orifice in an actuating device according to the invention (cf. the exemplary embodiment of FIG. 2). Moreover, valves may be used, having valve elements which are adjustable relative to one another and of which one represents the desired value and another the actual value (cf. the foregoing explanations relating to FIG. 1).

By the introduction of a defined leakage, achieved by means of the second pressure compensating orifice, in the medium which does the work, an equilibrium is established in the actuating device (also designatable as an actuator) between a working load and the actuator, as a result of which the control or regulating device (the positioning servo arrangement) is permanently as it were under "prestress", so that this has permanently to be readjusted, specifically even when the disengagement bearing arrangement is in holding positions, with the result that a large part of the hysteresis (static and sliding friction) is eliminated or its effects on the positioning behavior are reduced. The consequence of this is that the minimum regulating increment can be reduced to a fraction and the response behavior of the actuating device in the event of changes in position can be substantially more direct and therefore more advantageous. These advantages are achieved without appreciable extra costs. It is even possible to make savings, since an outlay which may possibly be lower is sufficient for the reduction of friction. Above all, control valves of simpler design may also be used, along with corresponding cost benefits.

Referring once again to the illustration in FIG. 6, the following attempt may also be made to explain the technical background behind the occurrence of the play travel during the extension and retraction of a piston of the pressure-medium power cylinder arrangement. In order to change the regulating travel of the piston before the commencement of extension, it is necessary, in addition to the counterload applied, for example by a diaphragm spring of the friction clutch, to apply a hysteresis load which is based on the static and sliding friction in the positioning servo arrangement and is in the form of a pressure-medium pressure. Conversely, before the commencement of retraction, the pressure-medium pressure must be reduced such as to fall short of the counterload plus the hysteresis load which then acts in opposition. For accurate positioning, therefore, whenever the direction of the piston is changed, the control quantity must be changed by the amount of a minimum control quantity change, in order to achieve a change in the pressure-medium pressure by the amount of a differential pressure corresponding to the hysteresis load, as compared with the pressure level prevailing in the holding state. The more pronounced the hysteresis is, the greater is the extent to which the control quantity for positioning has to be changed, along with corresponding effects on the regulating quantity (actual value) which becomes more uneven and more inaccurate.

The functioning of an actuating device according to the invention, including the effects of the second pressure compensating orifice, will be explained in more detail hereafter by means of a so-called "hydraulic PCA" which corresponds in its fundamental makeup to the exemplary embodiment of FIG. 2 and has a control valve of the pressure balance type and a hydraulic measuring cylinder detecting the position of the disengagement bearing arrangement. Reference is made to the control valve 42 of FIG. 2.

An essential effect of the second pressure compensating orifice is that, due to the constant escape of compressed air from that part of the pneumatic system which is on the pneumatic-cylinder side, in the maneuvering mode (small strokes, slow actuations) and in holding positions the control valve is held in an effective working range or, by virtue of the escape of compressed air according to the second pressure compensating orifice acting as a timer, is "restricted" to this working range.

Measurements were conducted within the framework of tests in which a test vehicle on a hill was first held by means of the friction clutch against rolling back, the clutch pedal was then moved (engaged) until the vehicle traveled forward to a minimal extent, a clutch position was thereupon set, which once again held the vehicle on the hill, and finally a clutch position in the direction of disengagement was set, in which the vehicle rolled back to a minimal extent, until it was stopped again via a corresponding clutch position. In a situation of this kind, the pressure-medium cylinder is in an intermediate position between a full engagement position (cylinder retracted) and a full disengagement position (cylinder extended). Without leakage, the control piston formed by the valve body 170 bears with its cover-element-side end on the cover element 172 (also designatable as a sealing cap), while the cover element 172 engages sealing on the cover seat. The pneumatic cylinder is thus closed off in a pneumatically leaktight manner when there is no second pressure compensating orifice provided.

By virtue of natural static and sliding friction of the valve body 170 and of the cover element 172 and by virtue of absolutely necessary return forces of the compression springs engaging on the valve body 170 and on the cover element 172 and also by virtue of the action of the compressed air (in general, of the pneumatic medium) on projected areas of the cover element 162 and of the valve body 170, a hydraulic control pressure of, for example, between 4 and 8 bar is established. If the hydraulic control pressure prevailing in the measuring cylinder 182 exceeds 8 bar, the control valve changes over to the first control state (I), in which a pneumatic connection between the pneumatic cylinder and the pneumatic source is made via the control valve. If the hydraulic control pressure in the hydraulic measuring cylinder 182 falls short of a pressure of 4 bar, the control valve changes over to the second control state, in which a pneumatic connection between the pneumatic cylinder and the first pressure compensating orifice is made via the control valve. Said pressure values are typical values which occur in this or a similar magnitude in the case of various control valves of the pressure balance type which are used in connection with actuating devices for a friction clutch. In principle, however, it is conceivable that markedly different control-pressure thresholds characterizing the changeover of the control valve between the control states may arise.

Figure 7:
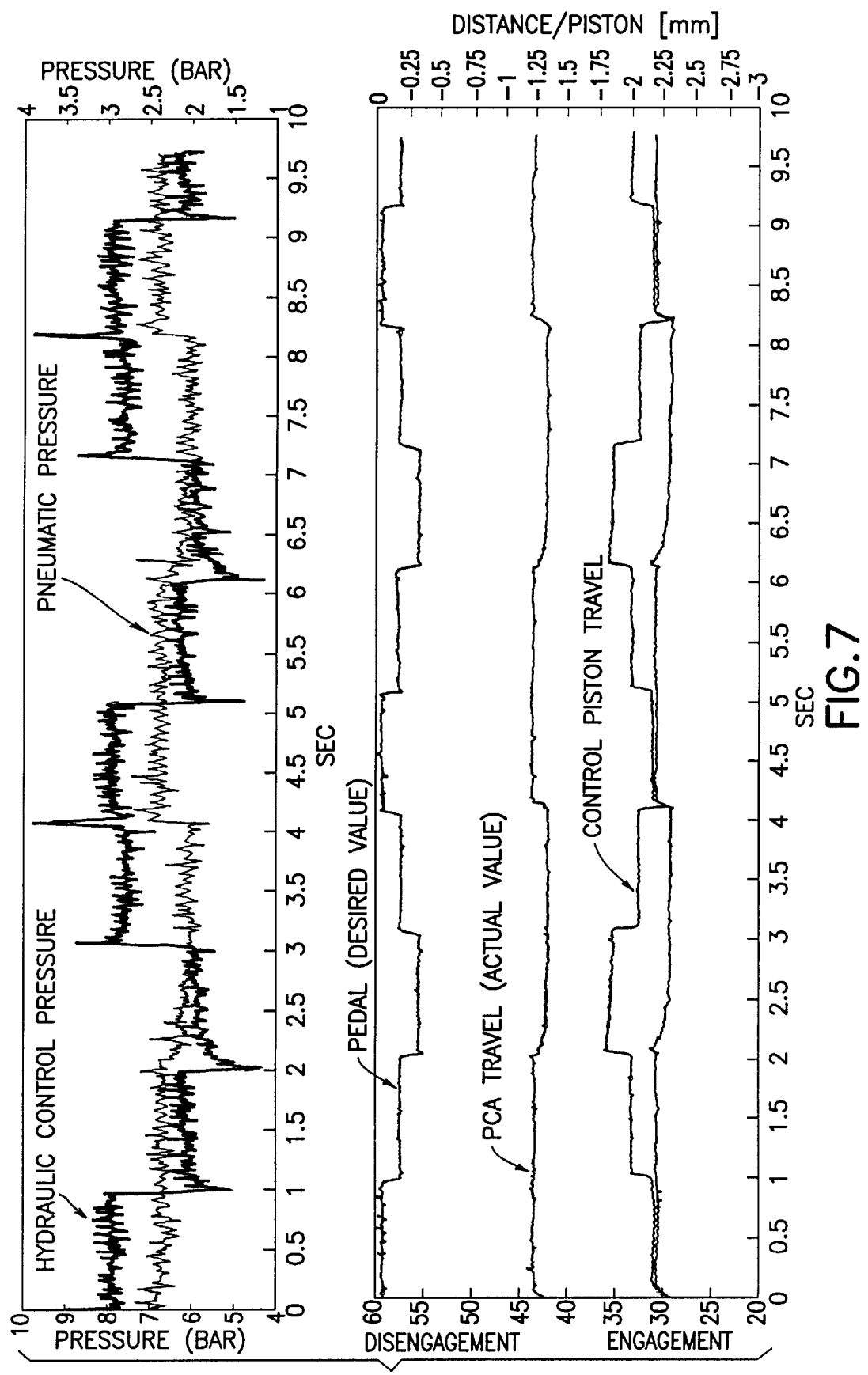
FIG. 7 shows measurement results for an actuating device with a control valve of the pressure balance type, without a second pressure compensating orifice according to the invention, which make it possible to draw conclusions as to the functioning of the control valve, as to the relationship between the desired value and the resulting actual value, a resulting hydraulic control pressure and a resulting pressure-medium pressure and as to the effects of desired-value changes on the quantities mentioned.

FIG. 7 shows, in two part graphs, changes in the desired value (here, a pedal travel), in a resulting actual value (PCA travel), in a resulting control-piston travel (travel of the valve body 170), in the resulting hydraulic control pressure in the hydraulic measuring cylinder and in the resulting pneumatic pressure in the pneumatic cylinder against time, for a measuring situation without leakage by a second pressure compensating orifice. The desired value was changed in 2% jumps with respect to the maximum stroke. The left Y-axis of the upper graph represents the hydraulic control pressure in the range of 4 to 10 bar with a linear subdivision into increments of 1 bar. The right Y-axis of the upper graph represents the pneumatic pressure in the range of 1 bar to 4 bar with a linear subdivision into increments of 0.5 bar. The X-axis represents time in a period of 0 to 10 s with a linear subdivision into increments of 0.25 s. The lower graph also plots, in addition to the desired value, the actual value and the control-piston travel, a second actual value which is measured at another point.

As may be seen from the upper graph of FIG. 7, the hydraulic control pressure predominantly assumes pressure values of 6 and 8 bar, a change in the desired value leading, where appropriate, to a changeover between the pressure levels. If an additional supply of compressed air into the pneumatic cylinder is necessary for the actual value to follow the desired value, the hydraulic control pressure must rise from an initial pressure level of about 6 bar to about 8 bar, in order to supply compressed air to the pneumatic cylinder. A smaller rise in the hydraulic pressure is not sufficient and does not result in any corresponding change in the actual value and in the pneumatic pressure.

Figure 8:
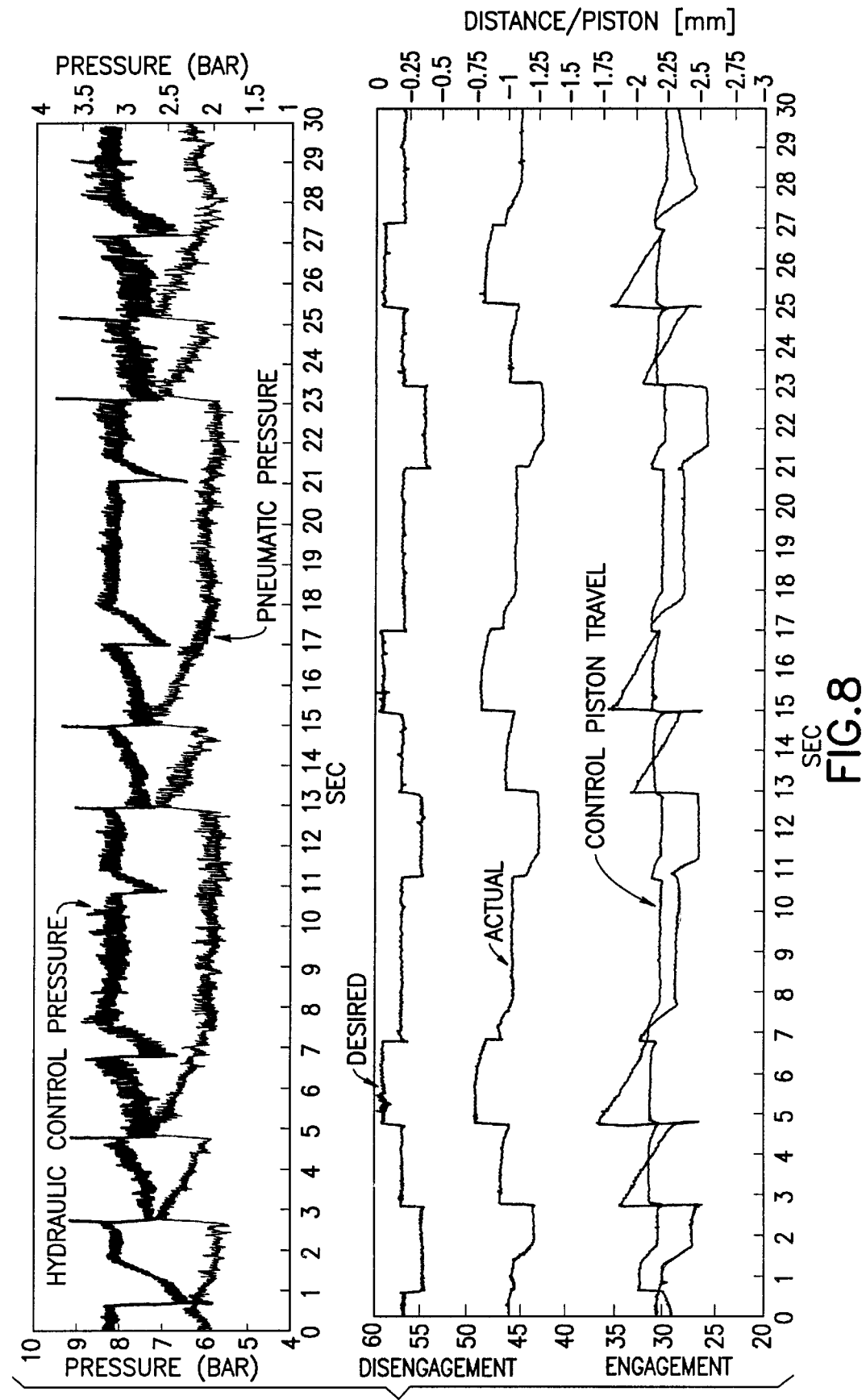
FIG. 8 shows measurement results corresponding to the measurement results of FIG. 7, for the situation where a second pressure compensating orifice with a flow cross section of 0.5 mm is provided.

By contrast, FIG. 8 shows the situation when a second pressure compensating orifice with a flow cross section of 0.5 mm is provided. The hydraulic control pressure in this case predominantly assumes a pressure level of about 0.8 bar. As a result of the defined leakage achieved by means of the second pressure compensating orifice, the control valve is induced to cause the continuously escaping compressed air to flow in again constantly, with the result that the control valve is held in a working range of its characteristic curve in which the valve body 170 lifts the cover element 172 off the cover seat to a minimal extent, that is to say an aerating connection between the pneumatic cylinder and the pneumatic source is made by the control valve. Consequently, for example in a maneuvering range of the actuating device or of the motor vehicle, the hydraulic control pressure is maintained at a restricted pressure range around 8 bar by the second pressure compensating orifice according to the invention (the expression "leakage timer" may also be adopted), with the result that the positioning servo arrangement, if appropriate the regulating system, is as if it were prestressed and is therefore capable of responding immediately. This leads to the already explained significant reduction of play in the positioning servo arrangement.

The foregoing explanations can also be comprehended in terms of the resulting control-piston travel indicated in FIGS. 7 and 8. When the second pressure compensating orifice is provided, the control piston is held virtually constantly in a position corresponding to a control-piston travel of −2.2 mm (right Y-axis of the lower graph, representation of the control-piston travel from 0 to −3 mm with a linear division into travel increments of 0.25 mm). After a desired-value change, a resulting change in the control-piston travel is returned to the value of about −2.2 mm according to a time constant dependent on the flow cross section of the second pressure compensating orifice (FIG. 8). Without the second pressure compensating orifice, the control piston assumes travel positions up to −1.8 mm. For a supply of compressed air to the pneumatic cylinder, the control piston must first be displaced into a position corresponding to −2.2 mm, thus leading to the play and response delays of the actuating device.

It should also be mentioned that the second pressure compensating orifice does not necessarily have to be formed by a single pressure-medium passage orifice serving as a pressure compensating orifice. The second pressure compensating orifice may also be formed by a plurality of different pressure-medium passage orifices which are referred to here, with the sense of a functional indication, as "the second pressure compensating orifice". The invention could therefore also be defined in that, according to the invention, at least one second pressure compensating orifice is provided.

It should also be mentioned, furthermore, that, due to the second pressure compensating orifice, as it were a "regulating error" of the positioning servo arrangement is introduced, since, when the positioning servo arrangement is in a holding state, pressure medium is necessarily supplied to the pressure-medium power cylinder arrangement from the pressure-medium source via the control valve. Without a second pressure compensating orifice, this control valve state corresponding to a supply of pressure medium would correspond to a deviation between the actual value and desired value. In contrast to this, where the second pressure compensating orifice is concerned, such a control valve state is assigned to a holding state where the desired value and actual value coincide. The "regulating error" introduced by the second pressure compensating orifice, as compared with an actuating device without a second pressure compensating orifice, must be taken into account in the assignment of the desired quantity to the actual quantity (for example, according to a characteristic curve corresponding to FIG. 3*b*), so that, in actual fact, a genuine regulating error ultimately does not occur, but, instead, the actuating device can even be positioned substantially more accurately.

In conclusion, the present invention relates to an actuating device for a friction clutch arranged in the drive train of a motor vehicle, said actuating device having a positioning servo arrangement with a pressure-medium power cylinder arrangement acting on a disengagement bearing arrangement. There is provision, according to the invention, for assigning to a pressure-medium subsystem comprising the pressure-medium power cylinder arrangement and a control valve of the positioning servo arrangement a pressure compensating orifice which, at least when the positioning servo arrangement is in a holding state, permits a defined pressure-medium pressure compensating flow, in order to influence at least one positioning behavior of the positioning servo arrangement.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. An actuating device for a friction clutch arranged in a drive train of a motor vehicle, between an internal combustion engine and a gear unit, said actuating device comprising a disengagement bearing arrangement for actuating the friction clutch;

a positioning servo arrangement having a pressure-medium power cylinder arrangement operatively arranged to act on the disengagement bearing arrangement;

a pressure-medium source;

a control valve connected to the pressure-medium source and the pressure-medium power cylinder arrangement so as to actuate the pressure medium power cylinder arrangement as a function of a command quantity representing a desired position and of an actual quantity representing a position of the disengagement bearing arrangement, the control valve comprising a valve arrangement adjustable between a first control state (I) connecting the pressure-medium power cylinder arrangement to the pressure-medium source and a second control state (II) connecting the pressure-medium power cylinder arrangement to a first pressure compensating orifice, the valve arrangement being changeable between the two control states (I, II) as a function of the actual quantity and of the command quantity; and a pressure-medium subsystem comprising the pressure-medium power cylinder arrangement, the control valve and a second pressure compensating orifice which, at least when the positioning servo arrangement is in a holding state, permits a defined second pressure-medium pressure compensating flow smaller than a first pressure-medium pressure compensating flow permitted by the first pressure compensating orifice in the second control state (II), in order to influence at least one positioning behavior of the positioning servo arrangement.

2. An actuating device as defined in claim 1, wherein the second pressure compensating orifice is arranged so as to improve a response behavior of the positioning servo arrangement.

3. An actuating device as defined in claim 1, wherein the second pressure compensating orifice is arranged and configured to reduce an idle time assigned to the positioning servo arrangement.

4. An actuating device as defined in claim 1, wherein the second pressure compensating orifice is arranged and configured to reduce a minimum regulating increment of the positioning servo arrangement.

5. An actuating device as defined in claim 1, wherein the second pressure compensating orifice is configured and arranged to reduce a regulating error of the positioning servo arrangement.

6. An actuating device as defined in claim 1, wherein the second pressure compensating orifice is configured and arranged to at least one of reduce a regulating hysteresis of the positioning servo arrangement and reduce a regulating travel play of the positioning servo arrangement.

7. An actuating device as defined in claim 1, wherein the valve arrangement is changeable between the two control states as a function of a differential quantity assigned to the actual quantity and to the command quantity.

8. An actuating device as defined in claim 7, wherein the valve arrangement is adjustable as a function of the differential quantity into a third control state (III), in which the pressure-medium power cylinder arrangement is not connected to both the pressure-medium source and the first pressure compensating orifice.

9. An actuating device as defined in claim 8, wherein the second pressure compensating orifice permits the second pressure-medium pressure compensating flow in the third control state.

10. An actuating device as defined in claim 9, wherein the second pressure compensating orifice permits the second pressure medium pressure compensating flow in the third control state and in at least one of the first control state and the second control state.

11. An actuating device as defined in claim 1, wherein the second pressure compensating orifice permits the second pressure-medium pressure compensating flow at least in the first control state.

12. An actuating device as defined in claim 11, wherein the second pressure compensating orifice permits the second pressure-medium pressure compensating flow in the first control state and in the second control state.

13. An actuating device as defined in claim 1, wherein the pressure-medium is one of a hydraulic pressure medium and a pneumatic pressure medium, the pressure-medium source being one of a pneumatic source and a hydraulic source.

14. An actuating device as defined in claim 13, wherein the pressure-medium source is a pneumatic overpressure source.

15. An actuating device as defined in claim 7, wherein at least one of the command quantity, the actual quantity and the differential quantity, is one of a hydraulic, pneumatic, mechanical and electrical quantity.

16. An actuating device as defined in claim 15, wherein at least one of the command quantity, the actual quantity and the differential quantity is one of a pressure, a volume, a force, a travel, an angle, a current and a voltage.

17. An actuating device as defined in claim 1, and further comprising a generator element arrangement assigned to the disengagement bearing arrangement, the generator element arrangement being operative to produce an actual-value signal indicating the actual quantity, and a clutch pedal arrangement operative to produce a command signal indicating the command quantity, the control valve having a first signal connection for selectively receiving the command signal indicating the command quantity from the clutch pedal arrangement and a second signal connection for receiving the actual-value signal indicating the actual quantity from the generator element arrangement.

18. An actuating device as defined in claim 17, wherein the command signal is one of a hydraulic, pneumatic, electrical and optical signal represented by one of a pressure, a volume, a force, a travel, an angle, a current, a voltage and a light intensity, and further comprising converter means assigned to the first signal connection for converting the command signal into the command quantity.

19. An actuating device as defined in claim 17, wherein the actual-value signal is one of a hydraulic, pneumatic, mechanical, electrical and optical signal represented by one of a pressure, a volume, a force, a travel, an angle, a current, a voltage and a light intensity, and further comprising converter means assigned to the second signal connection for converting the actual-value signal into the actual quantity.

20. An actuating device as defined in claim 17, wherein the positioning servo arrangement comprises a position regulating device which regulates the position of the disengagement bearing arrangement as a function of the command signal, of the actual-value signal and of a predetermined positioning characteristic curve.

21. An actuating device as defined in claim 20, wherein, on the positioning characteristic curve, each command signal is assigned a desired position of the disengagement bearing arrangement.

22. An actuating device as defined in claim 21, wherein each command signal is assigned a desired position of the disengagement bearing arrangement so that a desired-position range limited essentially by a position of commencing torque transmission and a position engaged for essentially maximum torque transmission is assigned a relatively greater command-signal range than other desired-position ranges.

23. An actuating device as defined in claim 1, wherein the positioning servo arrangement comprises an electrical position regulating circuit with an electrical measurement transducer operative to detect the position of the disengagement bearing arrangement.

24. An actuating device as defined in claim 1, wherein the positioning servo arrangement comprises a mechanical position regulating arrangement with a mechanically coupled generator element operative to detect the position of the disengagement bearing arrangement.

25. An actuating device as defined in claim 8, wherein the positioning servo arrangement comprises a hydraulic position regulating arrangement with a hydraulic measuring cylinder arrangement operative to detect the position of the disengagement bearing arrangement.

26. An actuating device as defined in claim 25, wherein the valve arrangement is capable of being changed over between the first control state (I), the second control state (II) and the third control state (III) as a function of the differential force between an actual force corresponding to the hydraulic pressure in the measuring cylinder arrangement and a preload.

27. An actuating device as defined in claim 25, wherein the pressure-medium power cylinder arrangement has a movable disengagement bearing arrangement side, the control valve being configured to operate on the pressure balance principle so that by being changed over between the control states the control valve maintains, at least during a clutch actuation phase, in the measuring cylinder arrangement a hydraulic pressure which remains essentially constant and is dependent on at least one of pressure-medium pressure and on a direction of movement of the disengagement bearing arrangement side of the pressure-medium power cylinder arrangement.

28. An actuating device as defined in claim 25, wherein the measuring cylinder arrangement is a slave cylinder arrangement which acts on the disengagement bearing arrangement and which, for emergency actuation of the clutch, is hydraulically connectable to a master cylinder actuable by a clutch pedal.

29. An actuating device as defined in claim 25, and further comprising hydraulic pressure-limiting means for counteracting a rise in the hydraulic pressure in the hydraulic system above a predetermined maximum value.

30. An actuating device as defined in claim 1, and further comprising a hydraulic slave cylinder arrangement provided so as to actuate the disengagement bearing arrangement.

31. An actuating device as defined in claim 30, wherein the hydraulic slave cylinder arrangement is configured and arranged to serve as a measuring cylinder arrangement.

32. An actuating device as defined in claim 7, wherein the valve arrangement comprises two valve elements moveable relative to one another and relative to a valve housing, and the command quantity is represented by a position of a first of the two valve elements and the actual quantity by a position of a second of the two valve elements relative to the valve housing, and the differential quantity being represented by a position of the two valve elements relative to one another.

33. An actuating device as defined in claim 32, and further comprising a generator element arrangement assigned to the disengagement bearing arrangement, the generator element arrangement being operative to produce an actual-value signal indicating the actual quantity, and a clutch pedal arrangement operative to produce a command signal indicating the command quantity, the control valve having a first signal connection for selectively receiving the command signal indicating the command quantity from the clutch pedal arrangement and a second signal connection for receiving the actual-value signal indicating the actual quantity from the generator element arrangement, the command signal and the actual-value signal act directly, in each case independently of the other signal in each case, on exactly one valve element of the two valve elements, the command signal on the first valve element and the actual-value signal on the second valve element.

34. An actuating device as defined in claim 1, wherein the control valve comprises at least one electromagnetically adjustable valve element.

35. An actuating device as defined in claim 34, wherein the control valve comprises at least one solenoid-actuable valve element.

36. An actuating device as defined in claim 1, wherein the second pressure compensating orifice is capable of being selectively activated and deactivated.

37. An actuating device as defined in claim 1, wherein the pressure-medium power cylinder arrangement is a single-acting pressure-medium power cylinder arrangement.

38. An actuating device as defined in claim 1, wherein the pressure-medium power cylinder arrangement is a double-acting pressure-medium power cylinder arrangement, the second pressure compensating orifice being one of assigned and selectively assignable one of to a pressure-medium chamber of the pressure-medium power cylinder arrangement assigned to a disengagement of the friction clutch, and to a pressure-medium chamber of the pressure-medium power cylinder arrangement assigned to an engagement of the friction clutch.

39. An actuating device as defined in claim 1, wherein the pressure-medium power cylinder arrangement is a double-acting pressure-medium power cylinder arrangement having a pressure medium chamber assigned to engagement of the friction clutch and a pressure-medium chamber assigned to disengagement of the friction clutch, the pressure-medium chamber assigned to engagement and the pressure-medium chamber assigned to disengagement each having its own second pressure compensating orifice that is selectively activatable and deactivable.

40. An actuating device as defined in claim 1, wherein the second pressure compensating orifice has a flow cross section which is coordinated with at least one of a narrowest supply flow cross section in the pressure-medium system connecting the pressure-medium source to the pressure-medium power cylinder arrangement, a cylinder volume of the pressure-medium power cylinder arrangement, a characteristic pressure-medium pressure level prevailing in the pressure-medium power cylinder arrangement when the positioning servo arrangement is in an actuating state, and a desired driving behavior of the motor vehicle.

41. An actuating device as defined in claim 40, wherein the pressure compensating orifice has a flow cross section of about 0.4 mm to about 0.8 mm.

42. An actuating device as defined in claim 41, wherein the pressure compensating orifice has a flow cross section of about 0.6 mm.

43. An actuating device as defined in claim 41, wherein the flow cross section of the second pressure compensating orifice of about 0.4 mm to about 0.8 mm is assigned to at least one of a cylinder volume of about 0.3 l to about 0.8 l a narrowest supply flow cross section of about 4 mm to about 10 mm, and a pneumatic pressure which, when the positioning servo arrangement is in an actuating state, is in a range of about 2.5 bar to about 3.5 bar, the pressure-medium power cylinder arrangement being a pneumatic power cylinder arrangement.

44. An actuating device as defined in claim 43, wherein the narrowest supply flow cross section is about 7 mm.

45. An actuating device as defined in claim 43, wherein the flow cross section of the second pressure compensating orifice is adaptable in case of one of a different cylinder volume, a different narrowest supply flow cross section, and a different pneumatic pressure range so that a corresponding positioning behavior is achieved.

46. An actuating device as defined in claim 1, and further comprising guide means for guiding at least one of the second and the first pressure compensating flow to at least one assigned point of one of the actuating device, the friction clutch and the motor vehicle in order to form the flow at the assigned point as at least one of a treatment flow and an auxiliary flow.

47. An actuating and/or positioning device, comprising: a servo arrangement with a pressure-medium power cylinder arrangement which acts on at least one element to be actuated and/or to be positioned; a pressure medium source; a control valve connected to the pressure-medium source and the pressure-medium power cylinder arrangement so as to actuate the pressure-medium power cylinder arrangement as a function of a command quantity representing one of a desired position and a desired actuating state and of an actual quantity representing one of an actual position and an actual actuating state of the element, the control valve comprising a valve arrangement adjustable between a first control state (I) connecting the pressure-medium power cylinder arrangement to the pressure-medium source and a second control state (II) connecting the pressure-medium power cylinder arrangement to a first pressure compensating orifice, the valve arrangement being changeable between the two control states (I, II) as a function of the actual quantity and of the command quantity; and a pressure-medium subsystem comprising the pressure-medium power cylinder arrangement, the control valve and a second pressure compensating orifice which, at least when the servo arrangement is in a holding state, permits a defined second pressure-medium pressure compensating flow smaller than a first pressure-medium pressure compensating flow permitted by the first pressure compensating orifice in the second control state (II), in order to influence at least one of positioning and actuating behavior of the servo arrangement.

* * * * *